US009494341B2

(12) United States Patent
Trujillo et al.

(10) Patent No.: US 9,494,341 B2
(45) Date of Patent: Nov. 15, 2016

(54) SOLAR TRACKING SYSTEM EMPLOYING MULTIPLE MOBILE ROBOTS

(71) Applicant: SolarCity Corporation, San Mateo, CA (US)

(72) Inventors: Salomon J. Trujillo, Redwood City, CA (US); Vayardo L. Ruiz, Santa Clara, CA (US); Noe Esparza, Santa Clara, CA (US); Jessica A. Riley, Mountain View, CA (US); Kevin C. Chu, Mountain View, CA (US); Wasiq Bokhari, Half Moon Bay, CA (US)

(73) Assignee: SolarCity Corporation, San Mateo, CA (US)

( * ) Notice: Subject to any disclaimer, the term of this patent is extended or adjusted under 35 U.S.C. 154(b) by 17 days.

(21) Appl. No.: 14/023,403

(22) Filed: Sep. 10, 2013

(65) Prior Publication Data
US 2015/0073594 A1 Mar. 12, 2015

(51) Int. Cl.
*B25J 5/00* (2006.01)
*F24J 2/40* (2006.01)
*B25J 5/02* (2006.01)
(Continued)

(52) U.S. Cl.
CPC .. *F24J 2/40* (2013.01); *B25J 5/02* (2013.01); *B25J 9/162* (2013.01); *B25J 9/1656* (2013.01); *F24J 2/405* (2013.01); *F24J 2/4638* (2013.01); *F24J 2/542* (2013.01); *G05B 2219/39146* (2013.01); *G05B 2219/39167* (2013.01); *Y02E 10/47* (2013.01); *Y10S 901/01* (2013.01)

(58) Field of Classification Search
CPC ........... B25J 5/005; B25J 5/02; Y02E 10/41; F24J 2/402; A01D 46/30
See application file for complete search history.

(56) References Cited

U.S. PATENT DOCUMENTS 4,355,630 A 10/1982 Fattor
4,509,501 A 4/1985 Hunter
(Continued)

FOREIGN PATENT DOCUMENTS

WO 2011/158199 A2 12/2011

OTHER PUBLICATIONS

Mack, M., Yield Study s:wheel location Almansa/Spain, by order of RWenergy GmbH, Solar Engineering Decker & Mack GmbH, Jul. 2008, 11 pages.
(Continued)

*Primary Examiner* — Khoi Tran
*Assistant Examiner* — Ryan Rink
(74) *Attorney, Agent, or Firm* — Kilpatrick Townsend & Stockton LLP

(57) ABSTRACT

The present invention relates to a highly-available and fault-tolerant solar tracking system and the process required to manage such a system. A fleet of multiple, redundant mobile robots managed by a task coordinator is deployed to track solar panels in a solar farm in alignment with the sun. Each robot has a control unit for engaging with a coupler connected to one or multiple solar panels and adjusting their orientation, as well as communicating with the task coordinator to receive tasks. The task coordinator senses various events such as robot failure/deterioration, as well as various environmental conditions, and sends tasks reconciled with event types. The system is highly-available and fault-tolerant as it remains operational as long as there is one operational robot. The task coordinator assigns tasks to the mobile robots so as to optimize battery life or other factors, such as, e.g., overall maintenance costs across the fleet.

6 Claims, 15 Drawing Sheets

(51) Int. Cl.
B25J 9/16 (2006.01)
F24J 2/46 (2006.01)
F24J 2/54 (2006.01)

(56) References Cited

U.S. PATENT DOCUMENTS

| | | | |
|---|---|---|---|
| 4,832,002 | A | 5/1989 | Medina |
| 4,906,359 | A * | 3/1990 | Cox, Jr. ............... B01F 3/0412 |
| | | | 210/170.02 |
| 6,676,363 | B1 | 1/2004 | Solignac |
| 6,959,993 | B2 * | 11/2005 | Gross et al. ................ 359/853 |
| 7,192,146 | B2 * | 3/2007 | Gross et al. ................ 359/853 |
| 7,252,083 | B2 | 8/2007 | Hayden |
| 7,444,816 | B2 * | 11/2008 | Hon ............................. 60/641.8 |
| 8,027,750 | B2 * | 9/2011 | Orita et al. ................... 700/253 |
| 8,316,840 | B2 | 11/2012 | Karim et al. |
| 8,381,501 | B2 | 2/2013 | Koselka et al. |
| 8,442,790 | B2 * | 5/2013 | Fukuba et al. ................. 702/85 |
| 8,950,336 | B2 * | 2/2015 | Camp et al. ................... 104/119 |
| 2003/0060927 | A1 | 3/2003 | Gerbi et al. |
| 2003/0208302 | A1 | 11/2003 | Lemelson et al. |
| 2004/0129380 | A1 | 7/2004 | Murphy et al. |
| 2004/0196587 | A1 | 10/2004 | Gupta et al. |
| 2004/0202062 | A1 | 10/2004 | Ostwald et al. |
| 2005/0139113 | A1 | 6/2005 | Kling |
| 2006/0271263 | A1 | 11/2006 | Self et al. |
| 2008/0011288 | A1 | 1/2008 | Olsson |
| 2008/0251115 | A1 | 10/2008 | Thompson et al. |
| 2008/0308094 | A1 | 12/2008 | Johnston |
| 2009/0060739 | A1 | 3/2009 | Robinson |
| 2009/0165841 | A1 | 7/2009 | Gunn, Jr. et al. |
| 2009/0249787 | A1 | 10/2009 | Pfahl et al. |
| 2009/0304940 | A1 * | 12/2009 | Heldt et al. ................. 427/427.2 |
| 2009/0320827 | A1 | 12/2009 | Thompson et al. |
| 2010/0000518 | A1 | 1/2010 | Chen et al. |
| 2010/0004087 | A1 | 1/2010 | Minegishi et al. |
| 2010/0031952 | A1 | 2/2010 | Zavodny et al. |
| 2010/0082171 | A1 | 4/2010 | Takehara et al. |
| 2010/0139644 | A1 | 6/2010 | Schwarzbach et al. |
| 2010/0206294 | A1 | 8/2010 | Blair et al. |
| 2011/0079266 | A1 | 4/2011 | Pan |
| 2011/0209696 | A1 | 9/2011 | O'Rourke |
| 2011/0226232 | A1 | 9/2011 | Grip |
| 2011/0240007 | A1 | 10/2011 | Currier |
| 2011/0284057 | A1 * | 11/2011 | Swahn .................... F24J 2/5237 |
| | | | 136/251 |
| 2011/0308512 | A1 * | 12/2011 | Nakasato et al. ............. 126/585 |
| 2012/0012101 | A1 * | 1/2012 | Trujillo et al. ............... 126/601 |
| 2012/0152877 | A1 | 6/2012 | Tadayon |
| 2013/0173051 | A1 * | 7/2013 | Bellante ............. G05B 19/4182 |
| | | | 700/230 |
| 2014/0033511 | A1 * | 2/2014 | Swahn et al. ................. 29/592.1 |
| 2015/0032252 | A1 * | 1/2015 | Galluzzo et al. ............. 700/218 |

OTHER PUBLICATIONS

PCT International Search Report and Written Opinion, PCT Application No. PCT/US11/43905, Dec. 16, 2011, 12 pages.

PCT International Search Report and Written Opinion, PCT Application No. PCT/US11/38412, Oct. 3, 2011, 14 pages.

PCT International Search Report, PCT Application No. PCT/US11/63144, Apr. 25, 2012, 13 pages.

Anton, et al., An Implementation of High Availability in Networked Robotic Systems, Advances in Rootics, Oct. 2008, pp. 1-25, intechopen.com, Austria.

Chaib, et al., Orientation system of solar panels based on a robo manipulator, International Conference on Renewable Energies and Power Quality, Apr. 2010, pp. 1-4, European Assoc. for the Dev. of Renwable Energies.

General Reference and Definition, High Availability, Wikipedia, Aug. 2, 2013, pp. 1-6.

Inman, D.J., Modeling and Control of Intelligent Flexible Structures, Final Technical Report, AD-A280 4 78, sponsored AFOSR/NA, Mar. 1994, 224 pages.

Mousazadeh, H., et al., A review of principle and sun-tracking methods for maximizing solar systems output, Renewable and Sustainable Energy Reviews, 2009, pp. 1-19, elsevier.com/locate/rser.

Yim, M. et al., "Modular Self-Reconfigurable Robot Systems", IEEE Robotics & Automation Magazine, Mar. 2007, pp. 43-52.

Yoon, Y., "Modular Robots for Making and Climbing 3-D Trusses", Master's Thesis, submitted on May 12, 2006 at Massachusetts Institute of Technology, 143 pages.

* cited by examiner

SOLAR TRACKING SYSTEM EMPLOYING MULTIPLE MOBILE ROBOTS

CROSS-REFERENCE TO RELATED APPLICATIONS

This application is related to U.S. patent application Ser. No. 13/118,274 filed on May 27, 2011 and published as 2011/0240007 to Tom Currier and is herein incorporated in its entirety.

FIELD OF THE INVENTION

The present invention relates to the field of solar tracking systems as well as the requisite adjustment and calibration apparatus, and in particular to multi-agent coordinated systems of robots for controlling the orientation of multiple solar surfaces that require constant alignment with the sun.

BACKGROUND ART

The field encompassing the theory and practice of fault-tolerant, redundant and highly-available systems has been an active area of study for the past several decades. While most of the research in this arena is focused on computer systems, the principles of practice apply to other fields with multiple, identical agents capable of replacing agents that have failed or have become degraded or otherwise impaired. There are numerous general background teachings about highly-available fault-tolerant systems. For a cross-section of these, the reader is referred to the following select references: Floyd Piedad and Michael W. Hawkins, "High Availability: Design, Techniques, and Processes", Prentice Hall. Dec. 28, 2000, ISBN 9780130962881; Evan Marcus and Hal Stern, "Blueprints for High Availability: Designing Resilient Distributed Systems", John Wiley & Sons, 2003, ISBN 0-471-43026-9; IBM Global Services, "Improving systems availability", IBM Global Services, 1998; Dhiraj K. Pradhan, "Fault-Tolerant Computer System Design", Feb. 14, 1996, ISBN 0130578878; Jan Vytopil, "Formal Techniques in Real-Time and Fault-Tolerant Systems" Second International Symposium, Nijmegen, Netherlands, Jan. 8-10, 1992, Published by Springer, 1991, ISBN-10 3-540-55092-5; and finally to the teachines provided by Mohammad Neilforoshan, "Fault tolerant computing in computer design", M.R Journal of Computing Sciences in Colleges archive, Vol. 18, Issue 4, April 2003, pgs. 213-220, ISSN: 1937-477.

The field of robotics has also been an active area of research and development for many decades. Here, the use of multiple robots, especially autonomous robots, to achieve a common goal or objective is a widely recognized field of interest. To gain a basic understanding and appreciation of the issues encountered in the field of multi-agent robotics the reader is directed to additional prior art references. Thus, for example, U.S. Pat. No. 6,836,701 teaches an autonomous multi-platform robot system for performing at least one functional task in an environment. Meanwhile, U.S. Pat. No. 8,483,930 teaches operations of a robot among a plurality of robots, where the robot is capable of avoiding mutual interference of a plurality of active sensors mounted on the other robots. This is done so that a task can be smoothly executed by each robot belonging to the plurality of robots. Furthermore, the reader will find an excellent overview of the entire field in the following prior art references: Tim Lueth et al., "Distributed Autonomous Robotic Systems 3", Dec. 10, 2011, Springer, ISBN-10: 3642722008 (ISBN-13: 978-3642722004); Jacak W. and Proell K., "Multiagent Architecture for Intelligent Autonomous Systems", Logistics and Industrial Informatics, $2^{nd}$ International Conference, Sept. 10-12, 2009, Linz, Austria, E-ISBN: 978-1-4244-3958-4, Print ISBN: 978-1-4244-3958-4.

Similarly, the field of solar tracking techniques and calibration devices has also been an active area of research and development for many years. For an understanding of this field, the reader is again referred to a number of useful prior art references. U.S. Pat. Appl. Pub. 2011/0240007 to Currier teaches a system and method for providing real time control of a heliostat array or CPV/PV module that reduces actuation cost. This teaching shows how to reduce the fixed cost of calibrating and repositioning an individual solar surface. U.S. Pat. No. 4,628,142 teaches a solar self-tracking mechanism for continuously tracking the movement of the sun with time. The mechanism has a solar radiant energy receiver secured to a base set on the ground and rotatable about a rotating shaft that extends horizontally in an east-west direction. It also has a plurality of compound parabolic concentrators secured to both longitudinal edges of the solar receiving mechanism in parallel to the rotating shaft.

Dual axis tracking of the sun is more directly addressed in U.S. Pat. Appl. Pub. 2010/0043866. This reference teaches a solar tracker for photovoltaic panels having a system for orienting same along two perpendicular axes. The tracker has a supporting platform provided with motorized wheels and at least two solar panel holders. U.S. Pat. Appl. Pub. 2013/0098425 also teaches a dual axis solar tracker apparatus and method using an azimuth actuator to adjust the azimuth of an attached solar panel and an elevation actuator to adjust the elevation of a panel seat holding the solar panel to track the azimuth and elevation of the sun as it moves through the sky. Still additional teachings are found in the following prior art references: David Cooke, "Single vs. Dual Axis Solar Tracking", Alternate Energy eMagazine, April 2011; William David Lubitz, "Effect of Manual Tilt Adjustments on Incident Irradiance on Fixed and Tracking Solar Panels", Applied Energy, Vol. 88 (2011), pp. 1710-1719.

Despite the extensive teachings available in each of the above areas of study, the prior art does not provide for an effective combination of the above three fields to address the needs encountered in managing solar tracking systems. More precisely, many challenges remain in devising a highly-available solar tracking system that could utilize multiple robots in an advantageous manner.

OBJECTS OF THE INVENTION

It is a general objective of the present invention to address the deficiencies of the prior art in a multi-disciplinary manner by combining aspects from the fields of highly-available and fault-tolerant systems, multi-agent robotics as well as solar tracking and calibration devices. More precisely, it is an object of the invention to utilize a multi-agent coordinated system of redundant robots in a solar farm or array consisting of multiple solar surfaces or panels requiring constant alignment with the sun. The deployment of multiple and redundant robots to change or track the solar surfaces in alignment with the sun aims to make the system highly-available, reliable and fault-tolerant.

It is an object of the invention to enable the development of solar farms and arrays that use mobile robots to change the positions of solar surfaces to maximize their energy production, and that can remain functional despite failure of one or more robots. Such a system would remain operational as long as there is a minimum of one functioning robot in the fleet.

It is another object of the invention to enable the development of solar power at a lower cost than is currently feasible, by reducing the cost of Maintenance, Repair and Operations (MRO) of a solar farm. In particular, by keeping the system functional for longer periods of time despite failure or deterioration of some subset of components (robots), it is an object to reduce the number of service calls required to maintain the system and thus reduces the overall cost of operation.

It is yet another object of the invention to deploy multiple mobile robots in a solar farm and to coordinate them centrally by a task coordinator that dispatches tasks to these robots as a part of operational procedures or in response to various events occurring at the solar farm.

It is still another object of the invention to have the task coordinator assign tasks to the robots in a manner that optimizes the batter lives of the fleet of robots.

Still another object of the invention is to have the task coordinator assign tasks to the robots in a manner that minimizes the cost of maintenance of the solar system.

These and other objects and advantages of the invention will become apparent upon reading the detailed description and the appended drawing figures.

SUMMARY OF THE INVENTION

The present invention relates to a highly-available solar tracking system. The system consists of multiple solar surfaces or solar panels in a solar array or solar farm. The system has a mobile robot fleet of mobile robots each of which has a control unit to communicate with a central command and a control center or a task coordinator. The mobile robots carry out the tasks or commands that are dispatched by the task coordinator.

The control unit on-board each mobile robot also has a coupling mechanism to engage with a corresponding coupler that is provided on the solar surfaces. There may be a coupler present on each solar surface or a single coupler may be used to control the orientation of multiple solar surfaces. The tasks consist of performing various operations on one or more solar surfaces and they may be issued or sent by the task coordinator in response to certain events. The operations can be performed once the control unit on the mobile robot assigned to perform the operation engages with the corresponding coupler on the solar surface.

An embodiment of the present invention employs a guide means to support and enable travel of the mobile robots to and from the solar surfaces. In the preferred embodiment, this guide means consists of a single rail or a system of rails that supports the travel of the mobile robots belonging to the mobile robot fleet. Further, the fleet of mobile robots may include both currently active and inactive robots. The task coordinator has the ability to select an inactive robot in the performance of a given task.

In the preferred embodiment of the invention the mobile robots are operated or powered by rechargeable batteries. The batteries are employed to provide power to robots in their active and mobile states. The batteries are charged when the robots are in their inactive states.

Further, the task coordinator has the ability to sense events and determine their type. Most often, the event belongs to a group that includes types such as robot failure, robot deterioration, wind environmental factor, rain environmental factor and/or still other environmental factor(s).

The invention also addresses the process of managing such a highly-available solar tracking system by managing multiple mobile robots through the control units mounted on each one of the robots. The control unit can couple or engage with the corresponding coupler of the solar surface or solar surfaces and can then change the orientation of the one or more solar surfaces. The process includes determining events by the task coordinator of the highly-available solar system or by its components. The system uses the task coordinator to centrally coordinate tasks sent to the control units of the mobile robots in response to those events. Alternatively, the task coordinator may dispatch tasks to the mobile robots as a part of an operational procedure that is a part of the normal operation of the system and not in response to any specific event. Of course, the task coordinator may also not dispatch any tasks at all to the mobile robots, depending to the situation.

The determination of an event of type "robot failure" by the task coordinator includes sensing the condition of each of the mobile robots and comparing it against a predetermined set of such conditions indicating a functional robot. If the comparison fails to confirm that the robot's performance meets the predetermined set of criteria for a functional robot, then the event is marked as type "robot failure". If the comparison indicates that the robot has not failed, but its performance has been degraded below a set threshold compared to the performance of a fully functional robot, then the event is marked of type "robot deterioration".

Response to the event of type "robot failure" includes the steps of redistributing all tasks that were assigned to the failed robot to other fully functional, or partially functional (deteriorated) robots based on their current operational capabilities. The response to the event of type "robot deterioration" includes the steps of redistributing all tasks that were assigned to the deteriorated robot that it can no longer perform as a result of its deterioration, to other fully functional robots that had not previously failed or are deteriorated by can still perform the corresponding tasks.

The determination of nay event of type environmental factor by the task coordinator includes sensing various environmental conditions on and around the one or more solar surfaces. These conditions most commonly include wind or rain. Specifically, determination by the task coordinator that the event is of type "wind environmental factor" includes sensing the speed and direction of the wind on the one or more solar surfaces and comparing it against a certain set of criteria for wind speed and direction. If the comparison indicates that current wind speed and direction exceed the certain set of criteria, the event type is marked "wind environmental factor". Similarly, the determination that the event is of type "rain environmental factor" by the task coordinator includes sensing the presence of rain or moisture on one or more of the solar surfaces and comparing the result against a certain set of criteria for the existence of rain. If the comparison indicates that the current moisture exceeds the certain set of criteria, the event type is marked "rain environmental factor".

Response to the event of type "wind environmental factor" includes assigning specific tasks to multiple robots to orient one or more of the solar surfaces as efficiently as possible to a specific position, referred to herein as "stow position", so as to minimize the impact of the wind environmental factor.

Response to the event of type "rain environmental factor" includes assigning specific tasks to one or multiple robots to orient one or more of the solar surfaces to a specific position, so as to facilitate cleaning of the one or more solar surfaces by the rain.

An operational procedure as mentioned above, involves sending a primary robot to adjust the orientation of all solar surfaces so as to maximize their energy production ("tracking pass"). Another such operational procedure involves sending a secondary robot after a tracking pass, to further refine and adjust the orientations of one or more solar surfaces so as to maximize their energy production ("adjustment pass").

While assigning tasks to the mobile robots, the task coordinator ensures that the battery life across the mobile robot fleet is optimized. This is accomplished in a number of different ways, including resting a robot to recharge its battery while a robot with a fully charge battery is selected from the next task. By assigning tasks repeatedly to the robot or robots with larger or newer batteries to work them harder, or by assigning tasks repeatedly to the robot or robots with the smaller or older batteries to drain them out.

Similarly, while assigning tasks to the robots, the task coordinator ensures that the maintenance cost across the solar system and specifically across the fleet is minimized. This is accomplished in a number of different ways, including assigning tasks to robots in a load-balanced manner such that the mechanical wear on the robots occurs uniformly, or by assigning tasks to robots in a manner such that mechanical wear on certain robots is accelerated so that their service can be timed to fall in a certain service window.

The details of the invention, including its preferred embodiments, are presented in the below detailed description with reference to the appended drawing figures

BRIEF DESCRIPTION OF THE DRAWING FIGURES

Figure 4A:
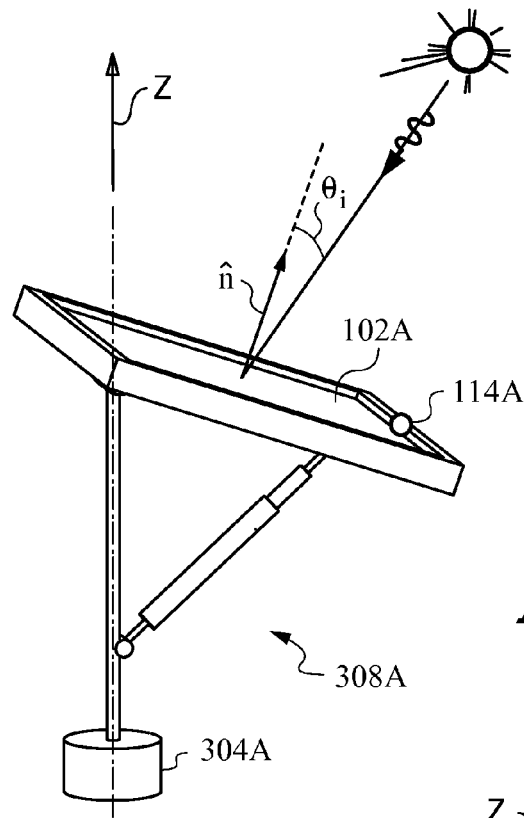
Figure 4B:
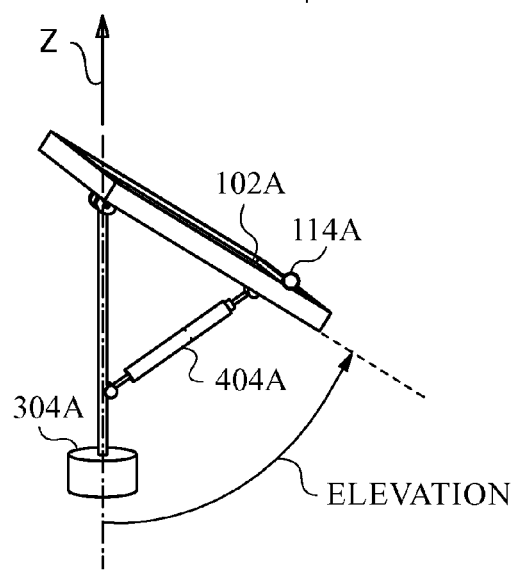
Figure 4C:
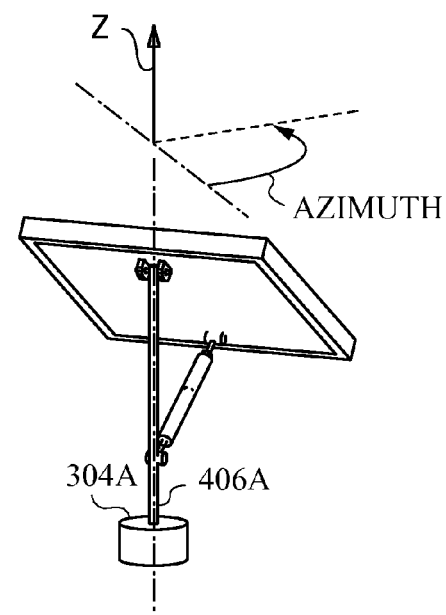

FIG. 4A-C show different perspectives of the typical dual-axis tracker mounted on the solar surface with two orthogonal axes of control, the horizontal axis (also known as azimuth) and the vertical axis or elevation (also known as altitude).

Figure 5A:
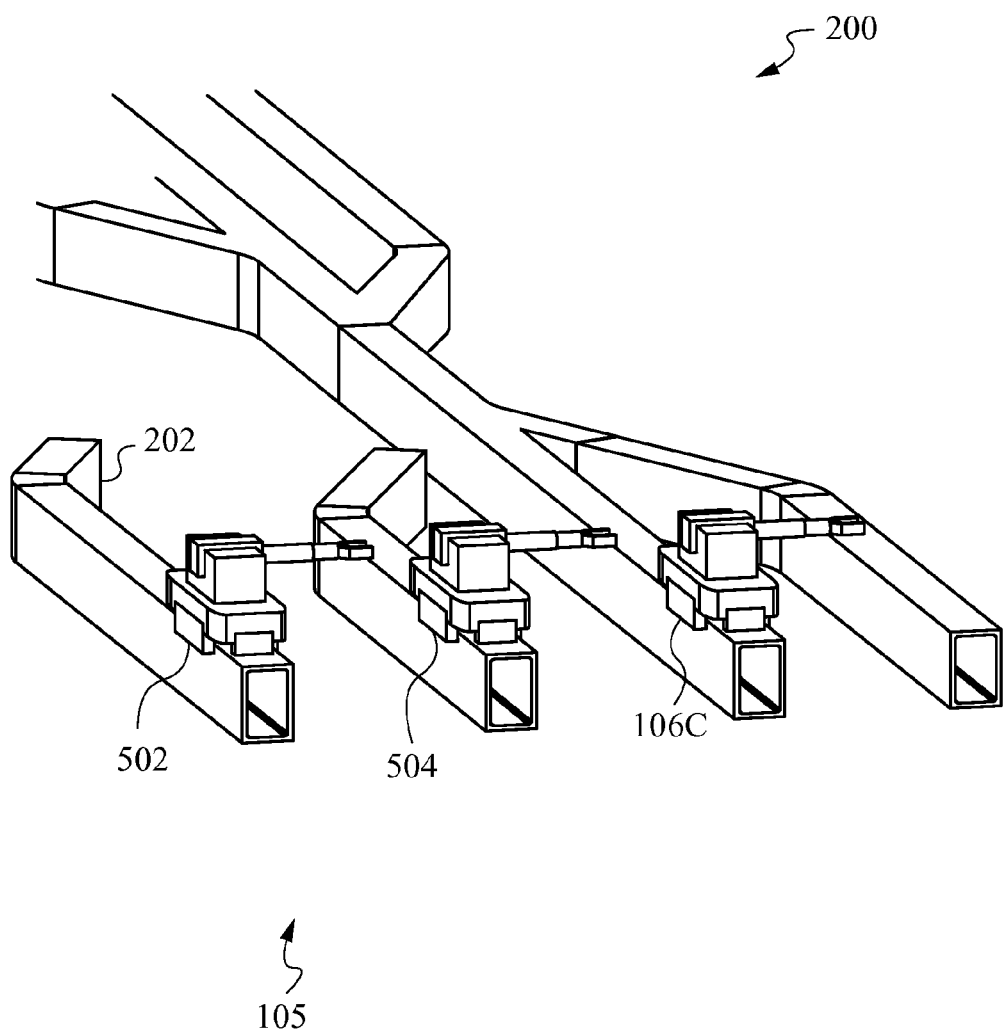

FIG. 5A shows a failed and a deteriorated robot amongst the mobile robot fleet belonging to the system.

Figure 5B:
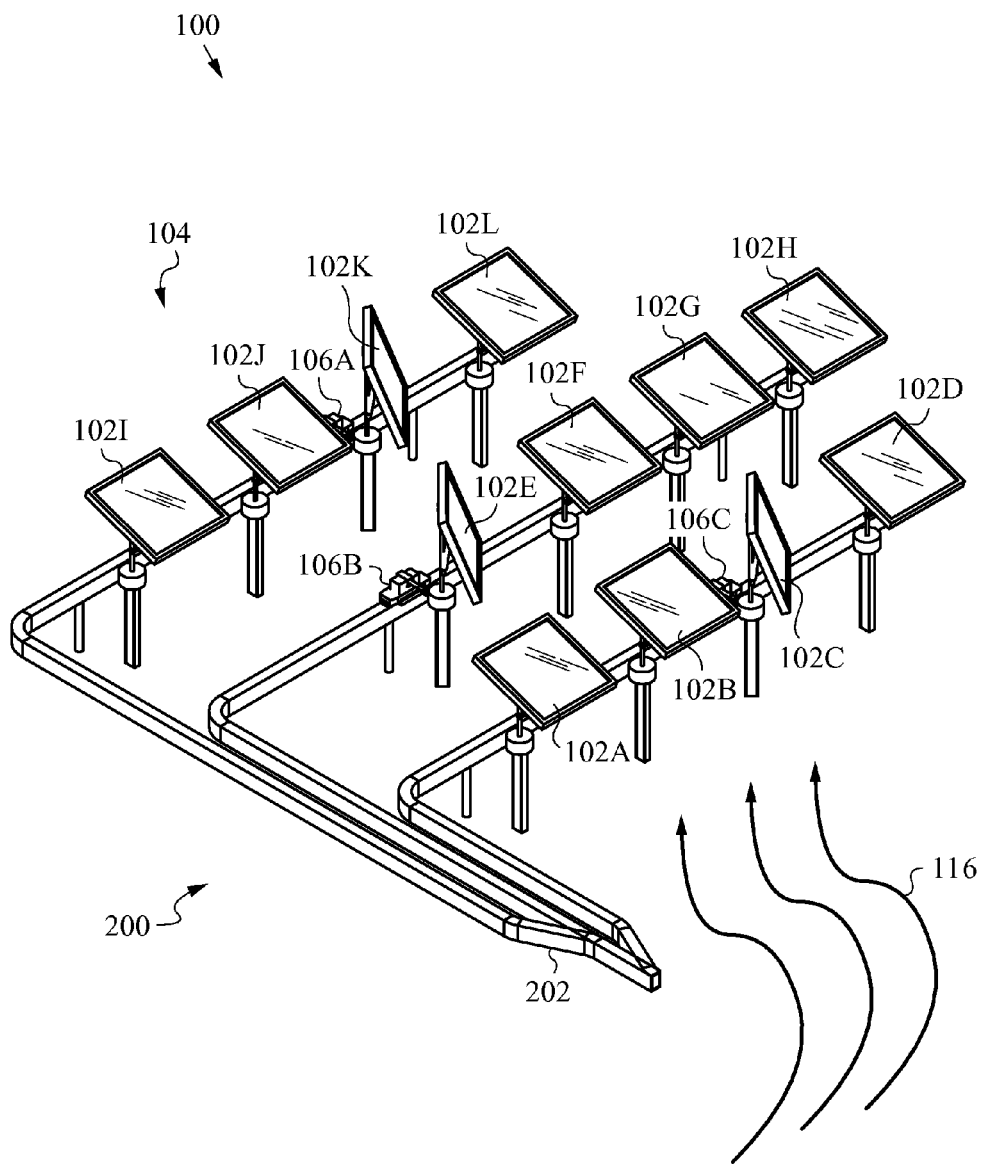

FIG. 5B shows a stow operation being performed by the mobile robots.

Figure 5C:
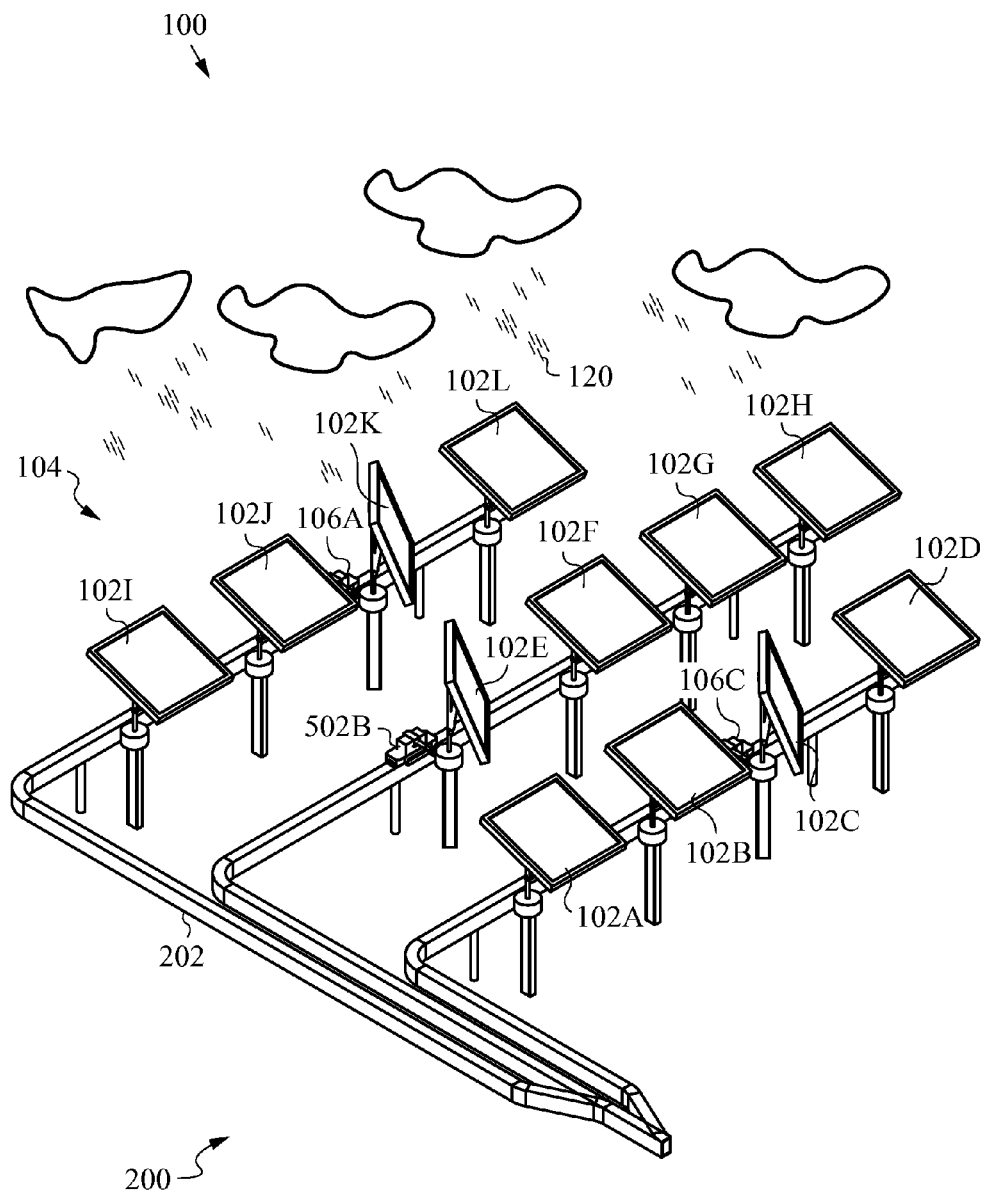

FIG. 5C shows mobile robots changing orientations of solar panels to be cleaned by rain.

Figure 6:
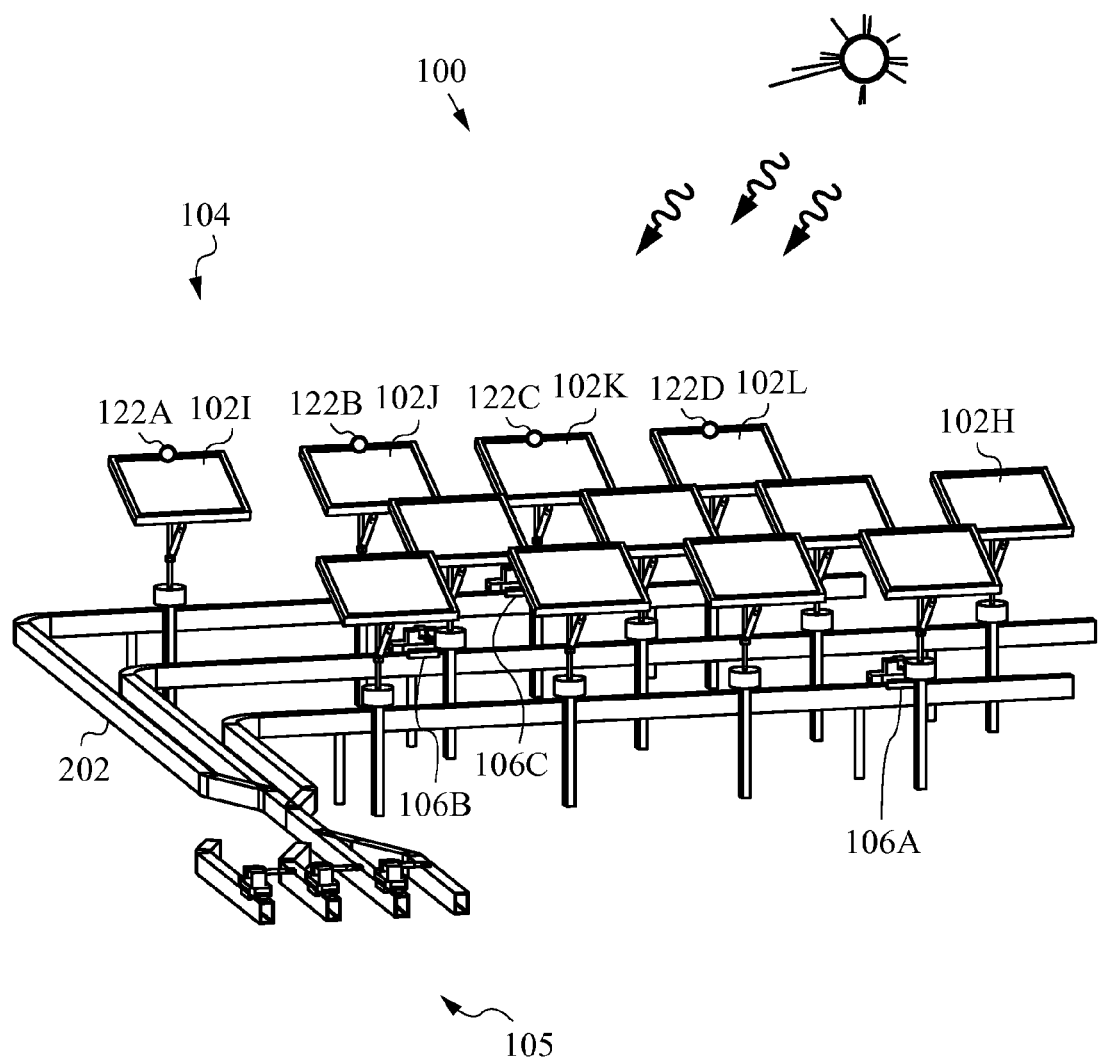

FIG. 6 shows a tracking pass being performed on the solar surfaces by a mobile robot.

Figure 7:
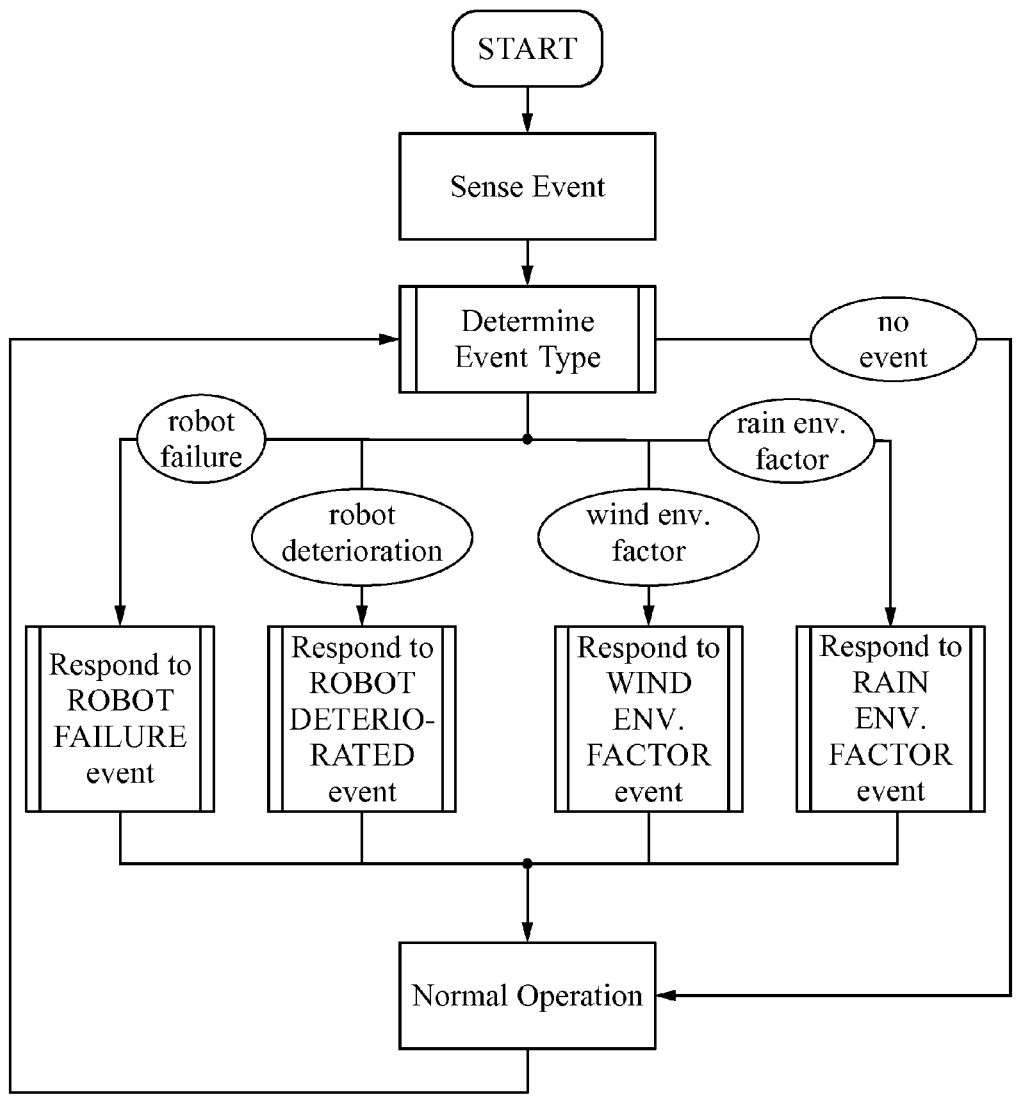

FIG. 7 shows a flow diagram of the steps provided by the invention to respond to events of various types.

Figure 8:
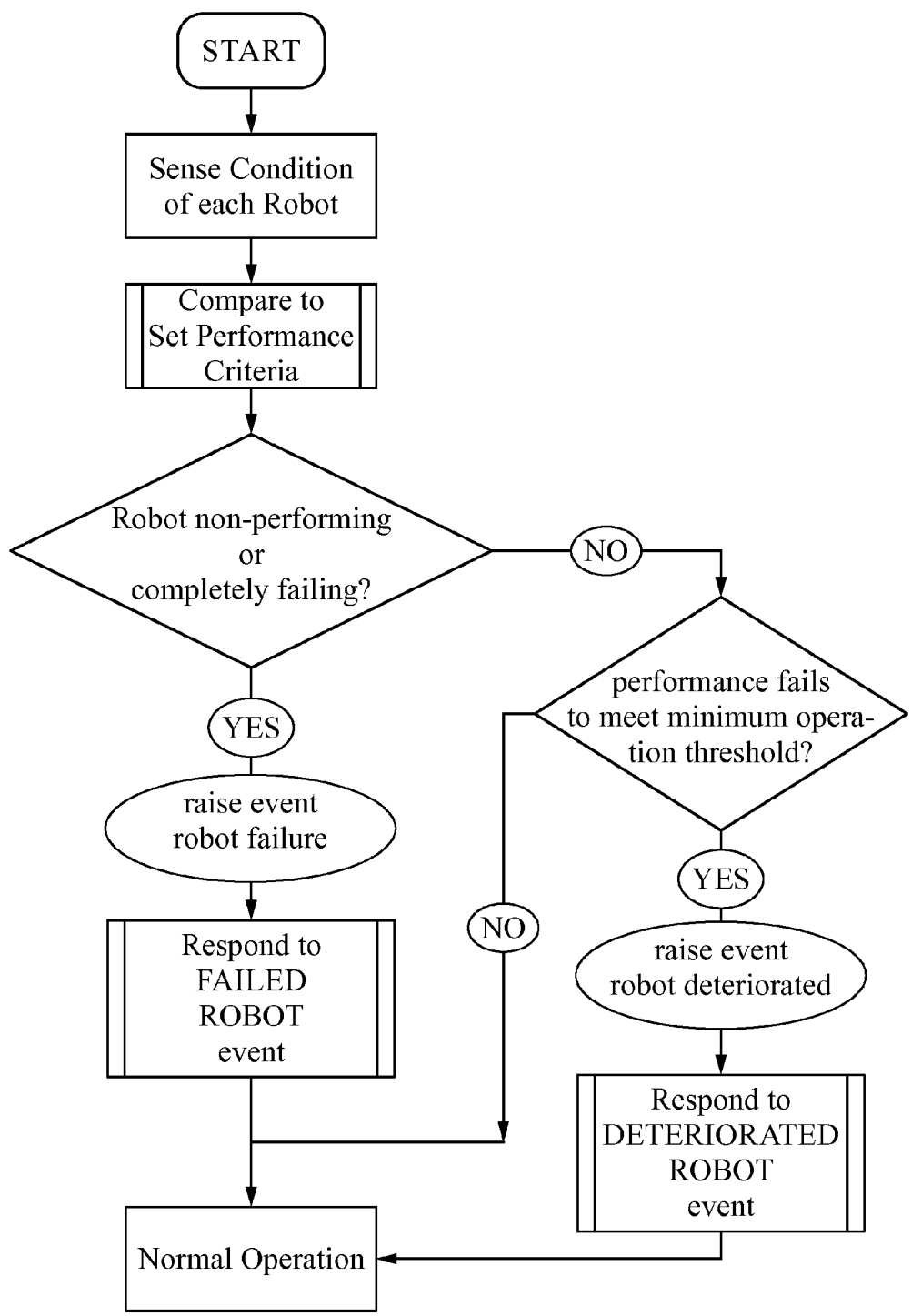

FIG. 8 shows a flow diagram of the steps provided by the invention to determine events of type robot failure and robot deterioration.

Figure 9:
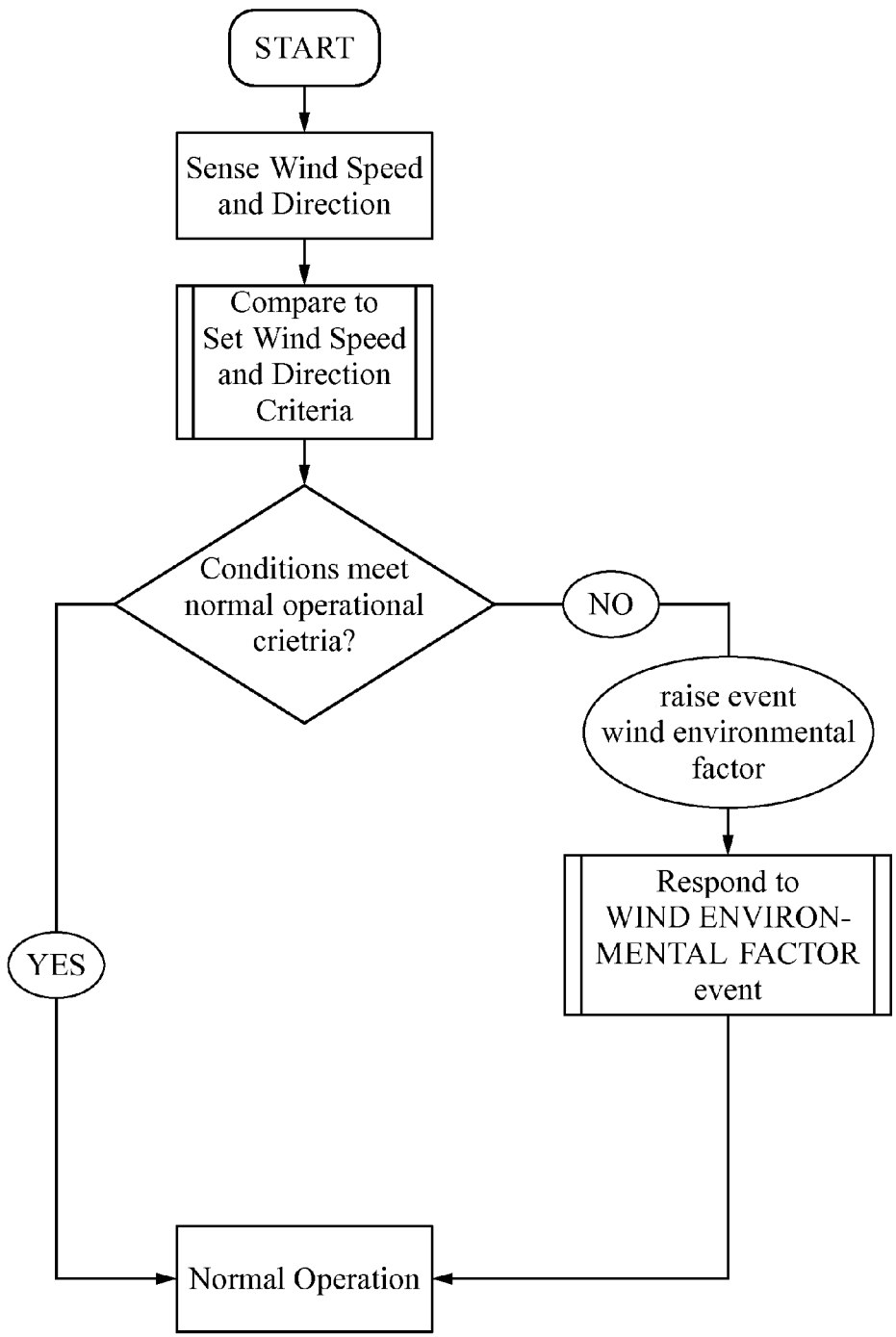

FIG. 9 shows a flow diagram of the steps provided by the invention to determine an event of type wind environmental factor.

Figure 10:
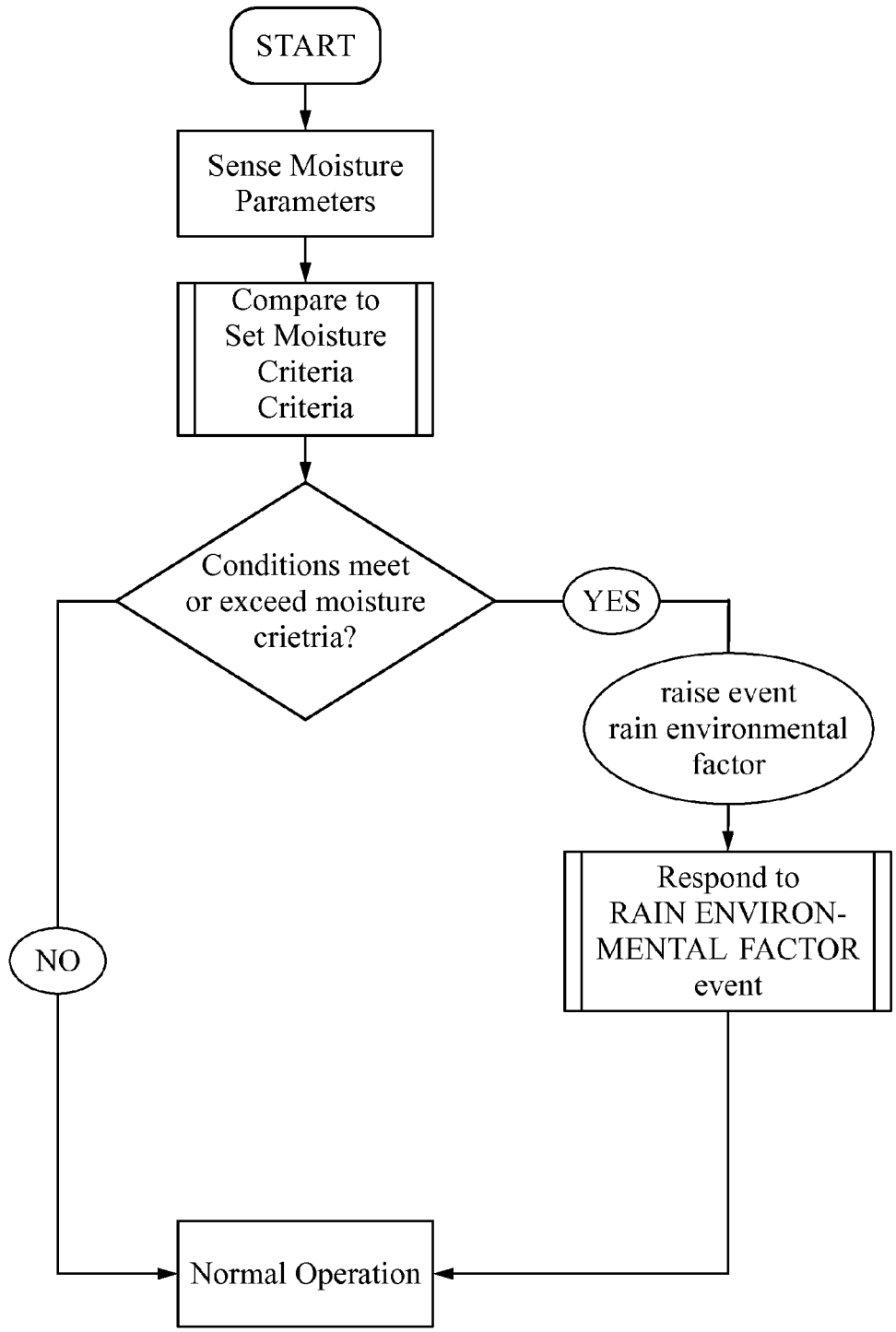

FIG. 10 shows a flow diagram of the steps provided by the invention to determine an event of type rain environmental factor.

Figure 11:
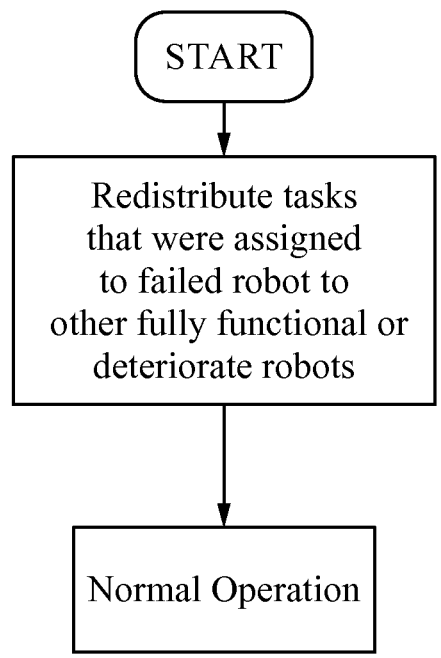

FIG. 11 shows a flow diagram of the steps provided by the invention in response to event of type robot failure.

Figure 12:
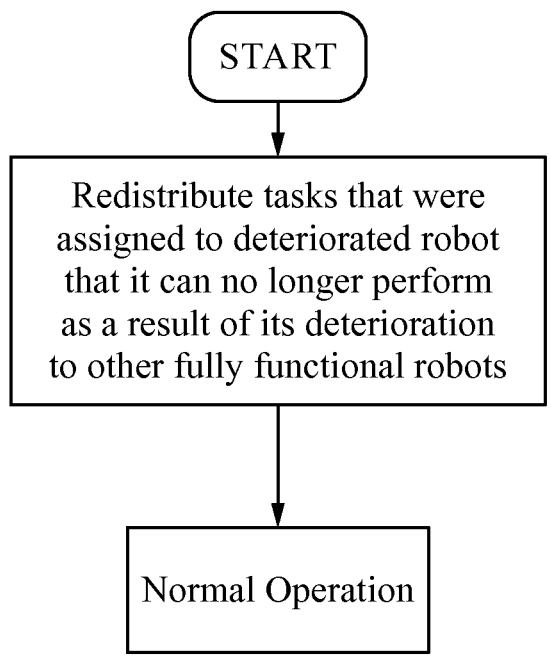

FIG. 12 shows a flow diagram of the steps provided by the invention in response to event of type robot deterioration.

Figure 13:
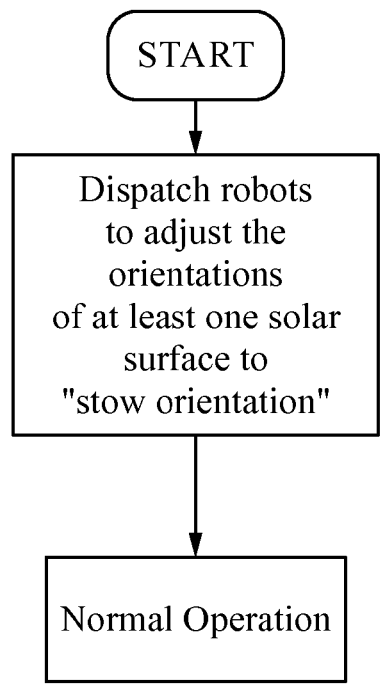

FIG. 13 shows a flow diagram of the steps provided by the invention in response to event of type wind environmental factor.

Figure 14:
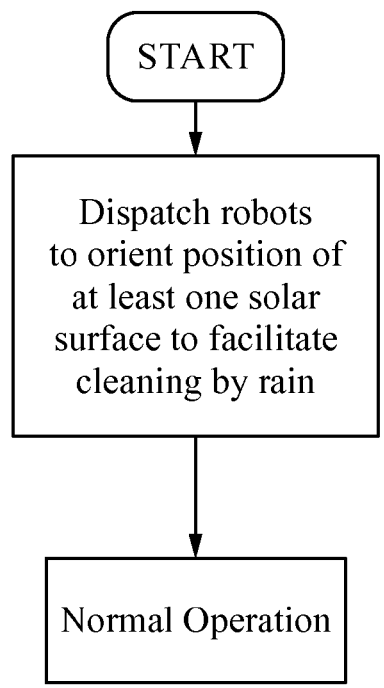

FIG. 14 shows a flow diagram of the steps provided by the invention in response to event of type rain environmental factor.

DETAILED DESCRIPTION

The present invention provides improvements in the field of solar tracking by describing a highly-available, reliable and fault-tolerant solar tracking system and the process required to manage such a system. The invention utilizes a multi-agent coordinated fleet of redundant and mobile robots that travel to the locations of the solar surfaces or panels to orient them with respect to the sun and thereby maximize their energy production. The mobile robot fleet is deployed in a solar farm or in an array consisting of multiple solar panels that need to be appropriately oriented. The orientation could be in direct alignment with the sun (facing the sun), or as otherwise required to account for shadowing by other solar panels (also referred to as "shadowing" or "backtracking" by those skilled in the art).

The figures and the following descriptions relate to preferred embodiments of the present invention by way of illustration only. It should be noted that alternative embodiments of the structures and methods disclosed herein will be readily recognized as viable options that can be employed without departing from the principles of the claimed invention.

Reference will now be made to several embodiments of the present invention, examples of which are illustrated in the accompanying figures. Similar or like reference numbers are used to indicate similar or like functionality wherever practicable. The figures depict embodiments of the present invention for purposes of illustration only.

Figure 1:
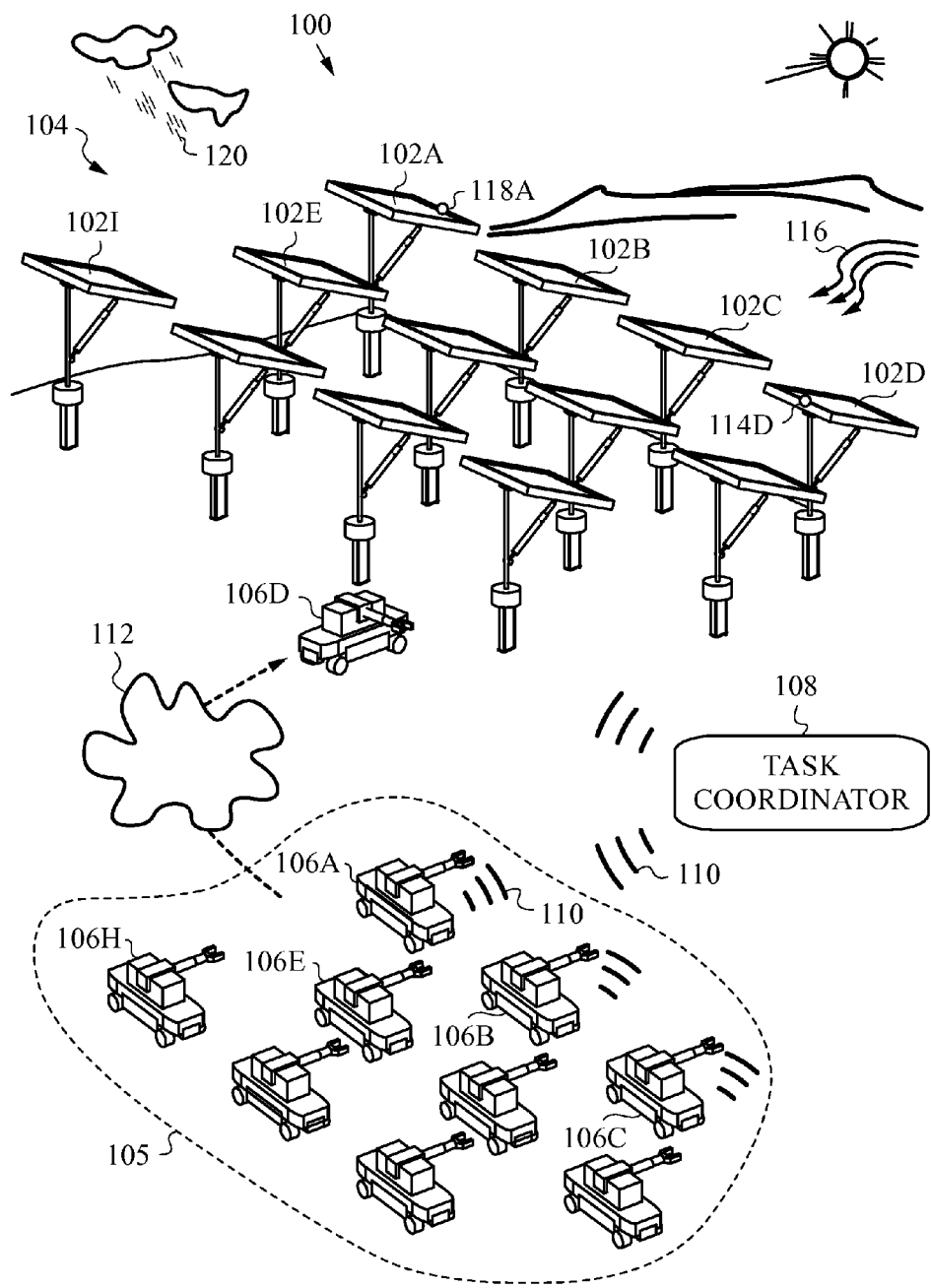
FIG. 1 is a conceptual view of a highly-available solar tracking system in accordance with the present invention.

The present invention will be best understood by first reviewing a highly-available solar tracking system 100 and its various components in accordance with the present invention as depicted in FIG. 1. Solar system 100 consists of a set of solar panels or solar surfaces 102 arranged in a solar array or solar farm 104. To differentiate between individual solar surfaces 102, surfaces 102A through 102D making up one of the rows of solar array 104 and several solar surfaces 102 in other rows, such as 102E and 102I, are designated individually.

Solar system 100 has a fleet 105 of redundant and identical mobile robots 106. Individual mobile robots 106 are designated in the same manner as individual solar surfaces 102 above. In particular, three robots 106A through 106C aligned in a first row are individually designated. Mobile robots 106E and 106H in other rows of fleet 105 are also identified.

All robots 106 belonging to fleet 105 are capable of traveling by a means of suitable transportation mechanism 112 to solar surfaces 102 and changing their orientations. Mechanism 112 is not explicitly shown in the present embodiment. It is understood by any person skilled in the art, however, that mechanism 112 can include any suitable provisions, mechanisms or conveyances that allow any one of robots 106, as shown explicitly in the case of robot 106D, to reach any one of solar surfaces 102. It is understood that mechanism 112 permits robot 106D to also return to fleet 105.

Mobile robots 106 are managed by a task coordinator 108. Task coordinator 108 is configured to dispatch tasks to each one of mobile robots 106 belonging to fleet 105. Task coordinator 108 and mobile robots 106 communicate by any appropriate means of communications 110 that are suitable given the environment where system 100 is deployed. In the present embodiment, means of communications 110 are embodied by wireless links and corresponding transceivers on-board each robot 106 and also installed in task coordinator 108 (not shown).

In the preferred embodiment of the invention, wind speed and direction sensors 114 are mounted on each solar panel 102. One such sensor 114D in particular is indicated on-board solar panel 102D. Sensors 114 are designed to measure the speed and direction of wind 116 on panels 102 at any given time. Any type of sensor technology capable of making the wind speed and direction measurements can be deployed. Once, performed, the measurement results are communicated to the task coordinator 108 by the communications means, in the present case embodied by wireless links 110. It will be understood by those skilled in the art that in other embodiments of the invention the wind speed and direction sensors 114 can be located at any appropriate place or places on or in the vicinity of the solar farm.

Furthermore, in the preferred embodiment system 100 also has moisture sensors 118 that are capable of measuring the amount of moisture on solar panels 102 at any given time. Only a single moisture sensor 118A mounted on solar panel 102A is shown in FIG. 1. It is duly noted that in some cases just one moisture sensor 118A may be sufficient. This may be the case in situations where moisture conditions on all panels 102 of array 104 are expected to be approximately the same (e.g., in the case of small solar system 100 confined to a small area). Thus, for example, in the present embodiment rain 120 affecting all panels 102 is detected by single moisture sensor 118A on-board panel 102A. As in the case of wind speed and direction, the moisture measurement is communicated to task coordinator 108 by wireless links 110.

Figure 2:
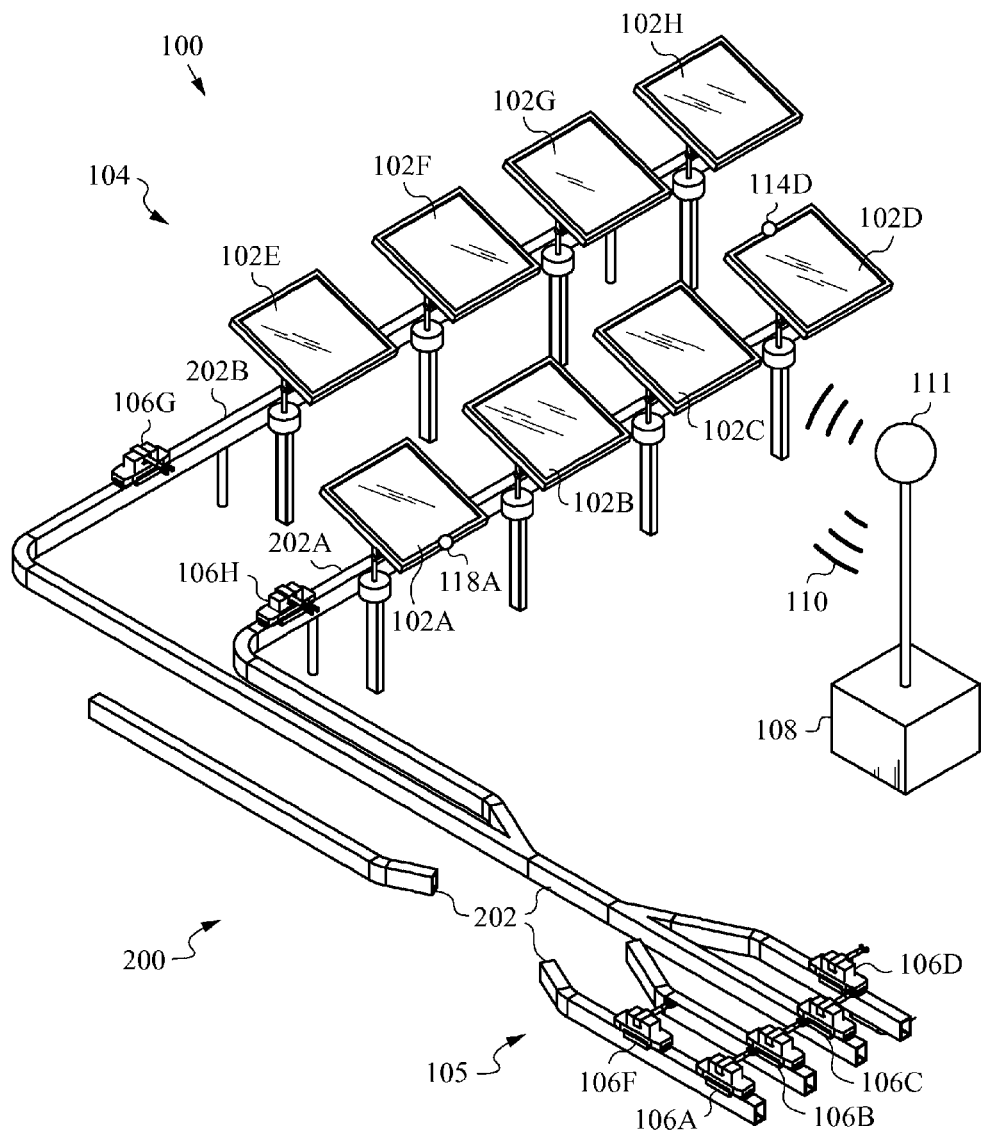
FIG. 2 depicts the preferred embodiment of a solar tracking system that employs rails as means of transportation of multiple mobile robots to and from the solar surfaces and wireless technology as the method of communication between the task coordinator and the robots.

FIG. 2 depicts highly-available system 100 in the preferred embodiment with several specific parts. In particular, in FIG. 2 transportation mechanism 112 is specifically embodied by a rail system 200 having rails 202. Hence, all mobile robots 106 belonging to fleet 105 are appropriately designed to travel on rails 202, which support and guide their transportation to and from solar surfaces 102. Of course, it will be readily recognized that there are many viable methods of transportation and therefore many different types of transportation mechanism 112 are possible without departing from the principles of the invention. For example, other embodiments of the invention can provide for transportation methods that include wheeled robots 106 following a path on the terrain where the solar panels 102 are located, conveyor belts or systems of conveyor belts to transport robots 106 to and from the solar panels 102, or even robots 106 that can fly to and from the location of the solar panels 102.

FIG. 2 does not show all rails 202 of rail system 200 and their interconnections. This is done for reasons of clarity and because the exact arrangement of rails 202 to transport each robot 106 of fleet 105 to and from each solar surface 102 admits of many topologically different solutions. Of course, any of those specific topological solutions that provides for conveyance of robots 106 to and from surfaces 102 is within the scope of the present invention.

Also, FIG. 2 shows a smaller portion of array 104 of solar panels 102 than illustrated in FIG. 1. In fact, just two rows with panels 102A-D and 102E-H are shown here. The specific rail segment that supports the travel of robots 106 to and from panels 102A-D is designated by reference 202A. In the present case, robot 106H is travelling on rail segment 202A at this time. Similarly, rail 202B permits travel of robots 106, and here of robot 106G in particular, to and from panels 102E-H. Also note, that rails 202 of rail system 200 generally approach array 104 of solar surface 102 from a different direction than shown in FIG. 1. Moreover, FIG. 2 depicts the task coordinator 108 introduced in FIG. 1 in one of its possible physical embodiments. Specifically, task coordinator 108 is embodied by a base station with an antenna 111. The latter forms a portion of the transceiver (not shown) belonging to coordinator 108 and enabling its wireless communication by wireless links 110 with mobile robots 106.

Figure 3A:
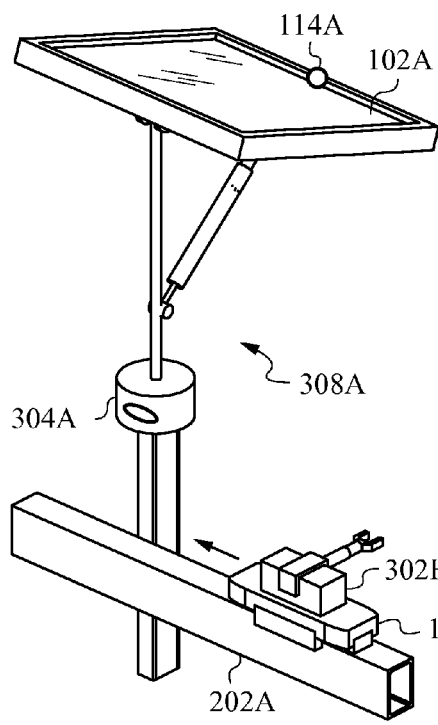
FIG. 3A shows the control unit of the mobile robot and the coupler of a solar surface in the preferred embodiment of the invention that utilizes a dual-axis tracker to control the orientation of each solar surface.

FIG. 3A depicts mobile robot 106H travelling on rail segment 202A toward solar surface 102A as shown in FIG. 2 in still more detail. Specifically, FIG. 3A shows a control unit 302H belonging to mobile robot 106H. It is noted, of course, that all robots 106 have corresponding control units 302. Similarly, FIG. 3A affords a detailed view of a coupler 304A belonging to solar surface 102A. Again, it is noted that all solar surfaces 102 are equipped with their own couplers 304 to support interaction with robots 106 through coupling with their control units 302.

The preferred embodiment utilizes a dual-axis mounting mechanism 308 also referred to as a "tracker" by those skilled in the art, for each solar surface 102. Tracker 308A belonging to solar surface 102A is shown in FIG. 1A. Other advantageous embodiments of the invention also use dual-axis trackers 308 for controlling the orientation of each solar surface 102 with respect to the sun. Of course, it will be readily recognized that in general other forms of tracking mechanisms for solar surfaces 102 can be deployed. In addition, any type of coupling mechanism between mobile robots 106 and solar surfaces 102 capable of controlling the selected trackers, whether dual-axis or single-axis, are within the scope of the current invention.

Figure 3B:
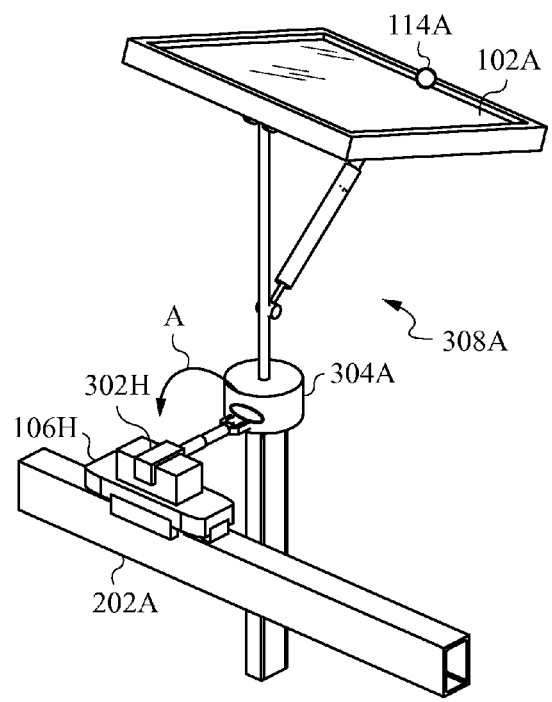
FIG. 3B shows the control unit of the mobile robot coupled with the coupler of a solar surface in the preferred embodiment of the invention that utilizes a dual-axis tracker to control the orientation of each solar surface.

FIG. 3B shows control unit 302H of mobile robot 106H coupled with coupler 304A of solar surface 102A. In this configuration, as indicated in general by arrow A, control unit 302H can impart the necessary adjustment to dual-axis tracker 308A and change the orientation of solar surface 102A.

Figure 3C:
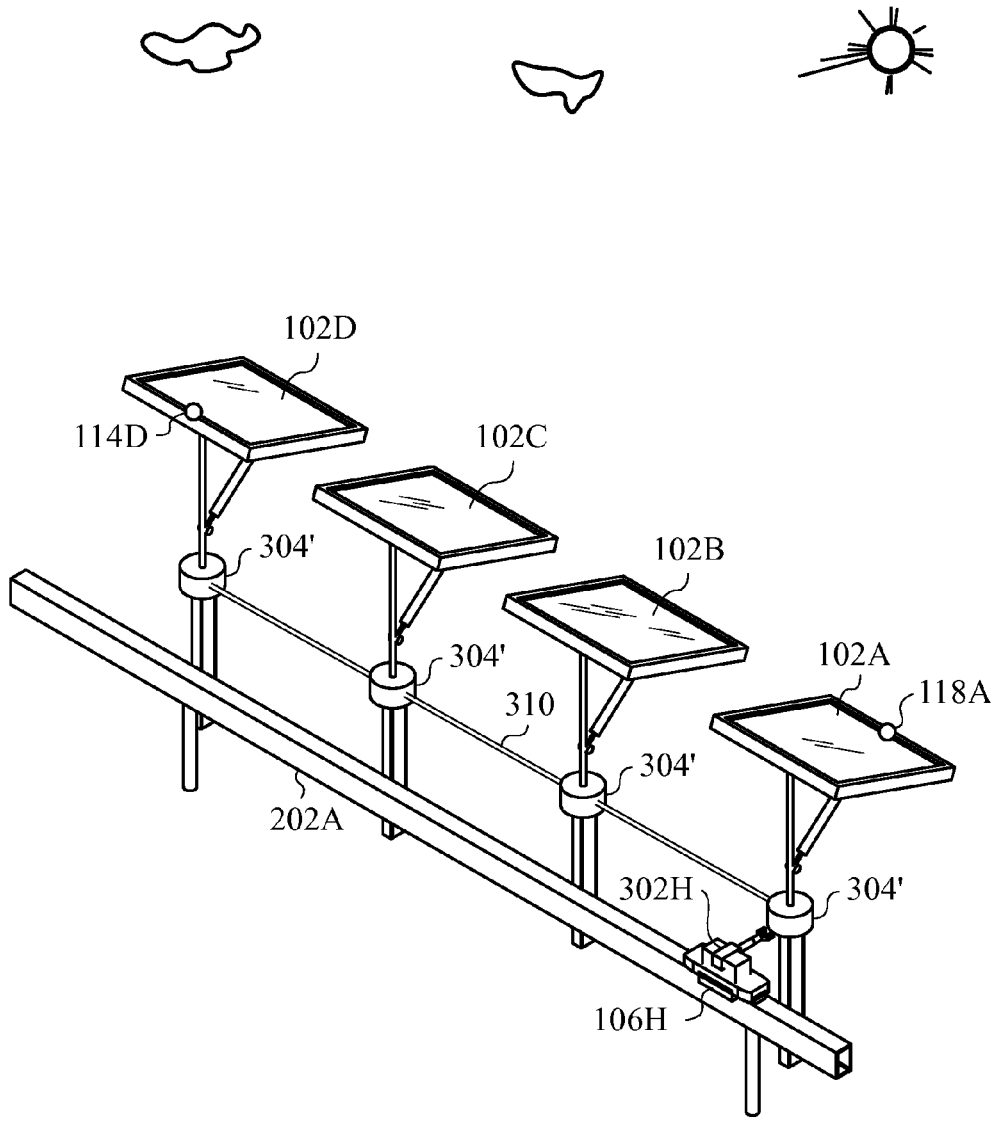
FIG. 3C shows the control unit of the mobile robot coupled with the coupler connected to multiple solar surfaces in an advantageous embodiment of the invention that utilizes a single dual-axis tracker to control the orientation of multiple solar surfaces.

FIG. 3C shows control unit 302A of mobile robot 106H coupled with a different type of coupler. In particular, control unit 302A is coupled to a series of four couplers 304' that are interconnected by a single dual-axis tracker 310 between solar surfaces 102A-D. In this advantageous embodiment, robot 106H can control the orientation of multiple solar surfaces 102A-D at the same time.

Efficient operation can be achieved in this advantageous embodiment of the invention that utilizes the specific type of dual-axis tracker 310 shown in FIG. 3C. This embodiment allows for a single dual-axis tracker 310 to control the positions of multiple solar surfaces as shown in FIG. 3C, where the single dual-axis tracker 310 and couplers 304' are attached to solar surfaces 102A-D and are able to control their orientation together.

Another embodiment of the invention can utilize a single-axis tracking mechanism for solar surfaces 102. Still another embodiment of the invention can utilize a coupling mechanism between control unit 302 of any mobile robot 106 and coupler 304 of solar surfaces 102 composed of mechanical gears. Yet another embodiment of the invention can utilize a tracking mechanism to control multiple solar surfaces and a coupling mechanism between robots 106 and solar surfaces 102 as described in U.S. patent application Ser. No. 13/118,274 filed on May 27, 2011 and published as 2011/0240007.

FIG. 4A shows dual-axis tracker 308A of solar surface 102A in more detail. Some of the mechanical parts that are required by dual-axis tracker 308A are indicated by hinges, pistons and other mechanicals for illustrative purposes only. A person skilled in the art will appreciate that any mechanism capable of performing the dual-axis tracking function can be used in the present invention.

FIG. 4B depicts how the elevation or vertical alignment (altitude) of solar surface 102A may be changed by controlling one axis of control 404A of coupler 304A belonging to solar surface 102A. FIG. 4C shows how the horizontal alignment (azimuth) of solar surface 102A may be changed by controlling another axis of control 406A of coupler 304A belonging to solar surface 102A. In the present embodiment, all solar surfaces 102 have corresponding controls 404, 406 to effectuate the changes or adjustments in orientations of solar surfaces 102. It should also be remarked here, that dual-axis trackers 308 do not necessarily need to be of the type having orthogonal axes as shown in FIGS. 4B-C. Non-orthogonal solutions including parallel manipulators such as, e.g., the Stewart platform, present viable options within the scope of the present invention.

The present invention prescribes using a fleet 105 of multiple, redundant, mobile robots 106 which are assigned the tasks of traveling to and from the location of solar panels 102 and using controls 404 and 406 of solar panels 102 to change their orientation. The travel of robots 106 to and from solar surfaces 102 is enabled here by rail system 200.

Depending on the application and size of system 100 mobile robots 106 belonging to fleet 105 can be powered in different ways. In the preferred embodiment, however, mobile robots 106 are all powered by rechargeable batteries. In other words, each robot 106 has an on-board battery pack. In an alternative embodiment, available in conjunction with rail system 200, mobile robots 106 are powered by a power source on-board rail system 200 itself, such as the one used in electricity powered trains (not shown). Such a power source could be embodied in the form of an electrified rail, supplied by wires overhead the rails or cables attached to mobile robots 106. Still another embodiment of the invention includes power provided from a central power source to mobile robots 106 by wireless means. Examples of such wireless power transmission technologies exist today and include Stanford University project on wireless power lead by Associate Professor Shanhui Fan of the Department of Electrical Engineering. This system, in the vein of many previous solutions of this type, uses magnetic fields to wirelessly transmit large electric currents between metal coils placed several feet apart and can be used for powering and/or recharging the batteries of mobile robots 106.

Further, the invention prescribes using task coordinator 108 for dispatching or sending tasks or commands to mobile robots 106. The communications between task coordinator 108 and mobile robots 106 in the present embodiment is enabled by communications links 110 that are wireless. As mentioned above, the communications platform for any particular case should be adapted to the environment where high-availability solar system 100 is located. In the preferred embodiment communication links 110 between task coordinator 108 and control units 302 of mobile robots 106 utilize wireless technology appropriately capable of sending and receiving messages where the solar system 100 is located and constructed.

Advantageous embodiments of the invention select different types of wireless technology depending on usage parameters. For example, communications links 110 can utilize wi-fi technology. In another advantageous embodiment of the invention, communication links 110 utilize Wimax technology. In still another embodiment of the invention, the communication links 110 utilize Bluetooth technology or RFID technology. In yet another embodiment of the invention, the means of communication represented by links 110 can be a wired technology such as Ethernet LAN with wired cables running between the mobile robots 204 and task coordinator 108. Still other embodiments may utilize the power lines of the electrified rails that provide power to mobile robots 106. Still another advantageous embodiment of the invention can utilize the power lines used by solar panels 102 to transmit their generated power.

Having described solar system 100 of the present invention and its components, now we will turn our attention to the operation of such a system as described by the invention.

In any solar farm or array, including system 100 of the present invention, it is desirable to continually reorient the positions of the panels or solar surfaces such that they are directly pointing at the sun throughout the day. Such continuous orientation adjustment yields the highest power output from solar panels 102, and also causes minimum amount of wear on the photo-voltaic cells typically deposited on surfaces of solar panels 102. Solar surfaces 102 are preferably mounted using dual-axis solar tracking mechanisms 308, such as the one depicted in FIG. 4A-C and described above. Mechanisms 308 can orient the position of each panel 102 to any direction in the sky by changing the vertical (altitude) and horizontal (azimuth) angles of the panel.

FIG. 7 depicts the flow chart comprising the steps carried out by task coordinator 108. In FIG. 7 through FIG. 14 a single box denotes a simple process step whereas a double box denotes a potential sub-routine, sub-process, or a procedure being called from the main flow of the steps.

Task coordinator 108 acts as the central nervous system of highly-available solar system 100, with sense-and-respond capability. Task coordinator 108 is responsible for coordinating tasks dispatched or assigned to mobile robots 106 to carry out various operations on solar panels 102. These operations consist of changing the orientation of solar panels 102 with the aid of controls 404 and 406 and they may be carried out in response to various events occurring at solar system 100, or as operational procedures performed as part of its normal operation. Additionally, at times, task coordinator 108 may not dispatch any tasks to mobile robots 106 at all. Task coordinator 108 can also sense the conditions surrounding highly-available solar system 100 and its components, and determine when such an aforementioned event has occurred. In the preferred embodiment of the invention, the task coordinator 108 can sense events of type robot failure, robot deterioration, wind environmental factor, and rain environmental factor. Additionally, overload, e.g., due to accumulation of snow on any one or more solar panels 102 can also be sensed.

Task coordinator 108 determines if any one of mobile robots 106 in fleet 105 has failed by comparing its performance against set criteria and determining whether any robot 106 has become non-operational. Further, task coordinator 108 determines if any mobile robot 106 has deteriorated by comparing its performance against set criteria and determining if the robot's performance has degraded below a set threshold. For example, a failure may occur in one of the adjustment motors of robot 106, while the drive and other adjustment motors remain operational. In this case, robot 106 is a deteriorated robot. Yet, it can continue to operate its working motors and perform only those operations that it is able to perform, while other functional robots 106 will be utilized to perform the missing operations unable to be performed by the deteriorated robot.

FIG. 5A depicts a deteriorated robot 502, a failed robot 504 and fully functional robot 106C in fleet 105 of mobile robots 106 belonging to solar system 100. In succeeding paragraphs of this section, it will be known that deteriorated robot 502 and failed robot 504 denote specific representations of mobile robot 106. As such, the reference number 106 when used without any modifier or qualification will be used as a generic representation of any mobile robot in mobile robot fleet 105 and it may include fully functional robot 106, deteriorated robot 502 and failed robot 504.

FIG. 8 depicts the flow chart comprising the steps carried out by task coordinator 108 to determine events of type robot failure and robot deterioration. The actual measurement of these events is performed in any manner known to those skilled in the art. For example, by running a performance check on any robot 106 or having robots 106 run self-checks and reporting the results to task coordinator 108. Alternatively, failure to perform a dispatched task may trigger a check-up of the corresponding robot 106.

Upon sensing the event of type robot failure, task coordinator 108 responds by relieving failed robot 504 of all the tasks assigned to it and reassigning those tasks to either one or more fully functional robots 106 or to other deteriorated robot or robots 502 or a combination thereof. The reason behind assigning the tasks of failed robot 504 to one or more deteriorated robots 502 is that deteriorated robot or robots 502 remain partially functional because only some subset of their components has failed, while other components remain operational. Hence, deteriorated robot or robots 504 can continue to operate its or their functioning components while other functional robots 106 will fill in the operations unable to be performed by the deteriorated robot or robots 502.

Once a robot has been determined to be a failed robot 502, it is no longer assigned any future tasks by task coordinator 108, until that robot 502 has been repaired and brought back to an operational level. Note that the operational level may not be fully functional. In other words, failed robot 502 may be brought back to a state that qualifies it as deteriorated robot 504.

Upon sensing the event of type robot deterioration task coordinator 108 responds by relieving deteriorated robot 502 of all the tasks it can no longer perform based on its condition of deterioration and reassigning those tasks to other functional robot or robots 106.

FIG. 11 depicts the flow chart comprising the steps carried out by task coordinator 108 in response to event of type robot failure. FIG. 12 depicts the flow chart comprising the steps carried out by task coordinator 108 in response to event of type robot deterioration.

In an advantageous embodiment of the invention, task coordinator 108 assigns tasks to the robots 502, 504, 106 in mobile robot fleet 105 based on the current operational capabilities of each one of the robots. For example, if a deteriorated robot 502A has deteriorated because of failure in one of its components A, while a deteriorated robot 502B has deteriorated because of failure of another of its components B, while still another deteriorated robot 502C has deteriorated because of failure of yet another of its components C, and so on, task coordinator 108 will have the knowledge of the current operational states of each of these deteriorated robots 502A-C and will assign tasks to them such that they can perform the assigned tasks despite their respective failed components. Of course, task coordinator 108 will also assign tasks to other fully functional robots 106, while it will not assign any tasks to any failed robots 504 unless the same has been repaired and brought back to an operational level.

Task coordinator 108 determines if an event of type wind environmental factor has occurred at the solar system 100 by sensing the speed and direction of wind 116 on the solar panels 102. In the preferred embodiment of the invention this measurement is done by sensors 114 on-board solar panels 102 and then communicated to task coordinator 108 by communication link 110. If the measurements exceed a set threshold then task coordinator 108 determines this to be an event of type wind environmental factor. In response to this event, task coordinator 108 dispatches one or more functional robots 106 or partially functional robots 502 or a combination thereof simultaneously to solar surfaces 102 to use controls 404 and 406 to change their orientations to minimize the impact of wind 116.

FIG. 5B depicts multiple robots 106, and in particular robots 106A, 106B and 106C changing the orientations of solar surfaces 102 subjected to wind 116. A desired orientation or position is generally referred to as a "stow position" by those skilled in the art. In FIG. 5B, solar surfaces 102C, 102E and 102K are shown already in stow positions exposing the smallest possible cross-section of their surfaces to wind 116. By using multiple robots simultaneously system 100 achieves stow position as efficiently as possible, thus minimizing the harmful effect of wind 116 on solar panels 102.

FIG. 9 shows the flow chart comprising the steps performed by task coordinator 108 to determine the event of type wind environmental factor. FIG. 13 depicts the flow chart comprising the steps carried out by task coordinator 108 in response to event of type wind environmental factor.

Task coordinator 108 determines if an event of type rain environmental factor has occurred at the solar system 100 by sensing the speed and direction of moisture on the solar panels 102. In the preferred embodiment of the invention this measurement is done by moisture sensors 118 on-board solar panels 102 and then communicated to the task coordinator 108 by communication links 110. If the measurements exceed a set threshold then task coordinator 108 determines this to be an event of type rain environmental factor. In response to such event, task coordinator 108 dispatches one or more functional robots 106 or partially functional robots 502 or a combination thereof simultaneously to solar surfaces 102 to changes their orientations with the aid of controls 404 and 406 to an orientation that facilitates cleaning of the solar surfaces by the rain 120. By using multiple robots simultaneously the system 100 achieves such a position as efficiently as possible, thus taking maximum advantage of rain 120.

FIG. 5C depicts multiple robots 106, namely fully functioning robots 106A, 106B as well as deteriorated robot 520B changing the positions of solar surfaces to cleaning position. Note that despite the appearance in this drawing, this position is in general not the same as the stowing position.

FIG. 10 shows the flow chart comprising the steps performed by task coordinator 108 to determine event of type rain environmental factor. FIG. 14 depicts the flow chart comprising the steps carried out by task coordinator 108 in response to event of type rain environmental factor. Of course, other environmental factors can be handled in a similar manner. For example, in the case of accumulation of snow or other heavy material that overloads any one or more solar surfaces 102, coordinator 108 can dispatch corresponding tasks to robots 106, 502 requesting them to change the orientations of affected surfaces 102. This will cause the overburdened surface 102 to dump the accumulated material such as snow.

An operational procedure for solar system 100 described by the invention is a "tracking pass" which consists of task coordinator 108 dispatching tasks to one or more mobile robots 106 and 502 to travel to one or more solar surfaces 102 and adjusting their orientation or position using controls 404 and 406 so as to maximize their power output. The tracking pass would be performed several times during the day to continually adjust the positions of panels 102 to directly face the sun or to otherwise account for shadowing or backtracking in order to maximize their power output.

FIG. 6 depicts mobile robots 106A, 106B, 106C performing a tracking pass on the solar panels 102. The output of insolation sensors 122A-D shown in FIG. 6 is used to confirm correct orientation (maximum power achieved when insolation vector is normal to the surface vector n, also see FIG. 4A). Of course, simply the power output of surfaces 102 can be used to properly track the sun. Suitable methods are well known to those skilled in the art.

Another operational procedure contemplated by the invention is an "adjustment pass" which consists of the task coordinator 108 sending tasks to one or more mobile robots 106 and 502 after an adjustment pass to again travel to one or more of the solar panels 102 and further adjust their orientations using controls 404 and 406 to a more refined and fine-tuned position with respect to the sun.

Task coordinator 108 assigns tasks to robots 106 and 502 in a manner that optimizes the battery life of all robots across the fleet 105. Based on the current state of the batteries of robots 106 and 502 in fleet 105, this can be accomplished in a number of different ways. For example, one can ensure this by uniformly utilizing the batteries and thus resting any particular robot 106 to recharge its batteries while another robot 106 with a fully charged battery is selected for the next task. It is also possible to utilize the batteries non-uniformly by assigning tasks repeatedly to any one robot or several robots 106 and 502 with larger or newer batteries to work them harder, or by assigning tasks repeatedly to the robot or robots with the smaller or older batteries to drain them out.

Similarly, task coordinator 108 assigns tasks to robots 106 and 502 in a manner that minimizes the maintenance cost of solar system 100, specifically the cost of maintenance of fleet 105. Depending on the current mechanical state of robots 106 in fleet 105, this can be accomplished in a number of different ways. For example, by assigning the tasks to robots 106 and 502 in a load-balanced manner such that the mechanical wear and tear on all robots 106 occurs uniformly. Alternatively, one can also proceed by assigning the tasks to robots 106 in a non-uniform manner such that mechanical wear and tear on certain robots is accelerated, so that their service can be timed to occur in a certain preferred time window of service. In this manner, the servicing of a highly-available solar systems 100 that is geographically remote can be scheduled with more flexibility.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

We claim:

1. A solar tracking system comprising:
 a plurality of solar panels;
 a mobile robot fleet having a plurality of mobile robots, each robot of the plurality having an on-board control unit configured to effect travel to any solar panel of the plurality of solar panels and to perform at least a first task to any solar panel of the plurality of solar panels;
 a control center configured to communicate with the control unit of each mobile robot of the plurality and to coordinate performance of one or more tasks to the plurality of solar panels with the plurality of robots by sending commands to one or more selected robots of the plurality to perform the one or more tasks, the one or more tasks including the first task,
 one or more sensors adapted for sensing a robot performance condition of individual robots of the plurality,
 wherein the control center is further configured to:
  determine a type of the robot performance condition based on a sensed measurement from the one or more sensors and comparison to a set performance threshold, wherein the type includes a fully functional robot, a deteriorated robot, and a robot failure;
  redistribute one or more tasks previously sent to a robot of the plurality for which a robot failure type is determined to another robot, the other robot selected from robots of the plurality having a fully functional and a deteriorated robot type; and
  redistribute one or more tasks previously sent to a robot of the plurality for which a deteriorated robot type is determined and which the respective robot is unable to perform to another robot for which a fully functional robot type is determined.

2. A method for managing a solar tracking system, the method comprising:
 managing a mobile robot fleet having a plurality of mobile robots, each robot of the plurality having an on-board control unit configured to effect travel to any solar panel of the plurality of solar panels and to perform at least a first task to any solar panel of the plurality of solar panels, wherein the first task is adjusting the inclinations of the plurality of solar panels to track the sun;
 adjusting the inclinations of the plurality of solar panels with one or more robots of the plurality, wherein the one or more robots are selected and dispatched to adjust the inclinations of the plurality of solar panels by a control center communicatively coupled with the control units of the plurality of mobile robots;
 sensing an event or condition with one or more sensors, wherein the event or condition corresponds to an environmental factor, robot performance, solar panel overload or any combination thereof;

determining a type of the condition, wherein the type of the condition includes any of a fully functional robot, a deteriorated robot, and a robot failure, the deteriorated robot condition being determined when sensed performance of a respective robot is less than a predetermined performance criteria;

determining the fully functional robot condition type for at least a first robot of the plurality;

determining the deteriorated robot condition type for at least a second robot of the plurality; and determining the robot failure condition type for at least a third robot of the plurality.

3. The method of claim 2 further comprising:

sending one or more commands to at least one robot of the plurality to perform one or more tasks; and determining the robot failure type for the at least one robot;

determining the fully functional robot type or the deteriorated robot type for another robot of the plurality;

sending one or more commands to the other robot of the plurality to perform the one or more tasks previously sent to the first robot based on determining the robot failure type for the at least one robot.

4. A method for managing a solar tracking system, the method comprising:

managing a mobile robot fleet having a plurality of mobile robots, each robot of the plurality having an on-board control unit configured to effect travel to any solar panel of the plurality of solar panels and to perform a plurality of tasks that include at least a first task to any solar panel of the plurality of solar panels, the first task comprising adjusting the inclinations of the plurality of solar panels to track the sun;

adjusting the inclinations of the plurality of solar panels with one or more robots of the plurality, wherein the one or more robots are selected and dispatched to adjust the inclinations of the plurality of solar panels by a control center communicatively coupled with the control units of the plurality of mobile robots;

sensing moisture on at least one solar panel of the plurality of solar panels;

determining a rain environmental factor when the sensed moisture corresponds to a predetermined moisture criteria; and in response to determining the rain environmental factor type, assigning a task to one or more robots of the plurality to adjust an orientation of one or more solar panels of the plurality to a position that facilitates cleaning of the respective one or more solar panels by rain.

5. A method for managing a solar tracking system, the method comprising:

managing a mobile robot fleet having a plurality of mobile robots, each robot of the plurality having an on-board control unit configured to effect travel to any solar panel of the plurality of solar panels and to perform at least a first task to any solar panel of the plurality of solar panels, wherein the first task is adjusting the inclinations of the plurality of solar panels to track the sun;

adjusting the inclinations of the plurality of solar panels with one or more robots of the plurality, wherein the one or more robots are selected and dispatched to adjust the inclinations of the plurality of solar panels by a control center communicatively coupled with the control units of the plurality of mobile robots;

wherein one or more tasks are assigned by a task coordinator to one or more robots according to a normal operational procedure, wherein the normal operational procedure comprises assigning a task to one or more robots of the plurality to adjust an orientation of one or more solar panels to a position that facilitates cleaning of the respective one or more solar panels by rain.

6. A method for managing a solar tracking system, the method comprising:

managing a mobile robot fleet having a plurality of mobile robots, each robot of the plurality having an on-board control unit configured to effect travel to any solar panel of the plurality of solar panels and to perform at least a first task to any solar panel of the plurality of solar panels, wherein the first task is adjusting the inclinations of the plurality of solar panels to track the sun;

adjusting the inclinations of the plurality of solar panels with one or more robots of the plurality, wherein the one or more robots are selected and dispatched to adjust the inclinations of the plurality of solar panels by a control center communicatively coupled with the control units of the plurality of mobile robots;

sensing an event or condition with one or more sensors, wherein the event or condition corresponds to an environmental factor, robot performance, solar panel overload or any combination thereof; and in response to a determination of a solar panel overload of one or more solar panels of the plurality, assigning a task, with a task coordinator, to one or more robots of the plurality to change an orientation of the respective one or more solar panels thereby dumping a material accumulated thereon.

* * * * *